(12) United States Patent
Muroshima et al.

(10) Patent No.: US 8,068,155 B2
(45) Date of Patent: Nov. 29, 2011

(54) SOLID-STATE IMAGE SENSOR AND DRIVING METHOD THEREOF, AND IMAGE SENSOR

(75) Inventors: Takahiro Muroshima, Kyoto (JP); Yasuyuki Endoh, Hyogo (JP)

(73) Assignee: Panasonic Corporation, Osaka (JP)

( * ) Notice: Subject to any disclaimer, the term of this patent is extended or adjusted under 35 U.S.C. 154(b) by 349 days.

(21) Appl. No.: 12/524,981

(22) PCT Filed: Jun. 28, 2007

(86) PCT No.: PCT/JP2007/062980
§ 371 (c)(1),
(2), (4) Date: Jul. 29, 2009

(87) PCT Pub. No.: WO2008/099520
PCT Pub. Date: Aug. 21, 2008

(65) Prior Publication Data
US 2010/0039543 A1 Feb. 18, 2010

(30) Foreign Application Priority Data
Feb. 13, 2007 (JP) .................................. 2007-031673

(51) Int. Cl.
*H04N 3/14* (2006.01)
*H04N 5/335* (2011.01)
(52) U.S. Cl. ........ 348/294; 348/298; 348/300; 348/302; 348/308; 348/312

(58) Field of Classification Search .................. 348/257, 348/294, 300, 301, 302, 308, 312; 257/290–292; 250/208.1
See application file for complete search history.

(56) References Cited

U.S. PATENT DOCUMENTS

| | | | |
|---|---|---|---|
| 2004/0239786 A1* | 12/2004 | Masuyama et al. | 348/294 |
| 2006/0170794 A1 | 8/2006 | Higuchi et al. | |
| 2006/0176519 A1 | 8/2006 | Ouchi | |

FOREIGN PATENT DOCUMENTS

| | | |
|---|---|---|
| JP | 2000-287131 | 10/2000 |
| JP | 2005-057612 | 3/2005 |
| JP | 2006-197229 | 7/2006 |

* cited by examiner

*Primary Examiner* — Yogesh Aggarwal
(74) *Attorney, Agent, or Firm* — McDermott Will & Emery LLP (57) ABSTRACT

A solid-state image sensor includes: a plurality of pixels, each having a photodiode, a floating diffusion, a transfer transistor, a reset transistor, and an amplifying transistor; vertical signal lines 31 for receiving signals from the plurality of pixels; sampling capacitors 62; circuits 78 for comparing a voltage on a corresponding one of the vertical signal lines 31 with a reference voltage to determine whether the voltage on the corresponding vertical signal line 31 is higher or lower than the reference voltage; and clip circuits 79 for outputting a clip voltage Vclip to a corresponding one of the sampling capacitors 62 based on the output of a corresponding one of the circuits 78. A voltage on each vertical signal line in the state where the signal accumulated in a corresponding photodiode has been transferred to a corresponding floating diffusion, can be used as a comparison voltage of each column.

18 Claims, 10 Drawing Sheets

SOLID-STATE IMAGE SENSOR AND DRIVING METHOD THEREOF, AND IMAGE SENSOR

RELATED APPLICATIONS

This application is the U.S. National Phase under 35 U.S.C. §371 of International Application No. PCT/JP2007/062980, filed on Jun. 28, 2007, which in turn claims the benefit of Japanese Application No. 2007-031673, filed on Feb. 13, 2007, the disclosures of which Applications are incorporated by reference herein.

TECHNICAL FIELD

The present invention relates to circuits for suppressing black crushing of an output image, which is caused by incidence of bright light, in a solid-state image sensor, and methods thereof.

BACKGROUND ART

In order to remove fixed pattern noise which is generated by variation in reset potential of a floating diffusion (FD), and variation in threshold voltage of a pixel amplifying transistor, solid-state image sensors generally include a fixed-pattern-noise cancellation circuit (FPN cancellation circuit) for outputting the difference between an output potential of a vertical signal line when resetting the FD and an output potential of the vertical signal line when reading a signal, as an output signal.

Figure 8:
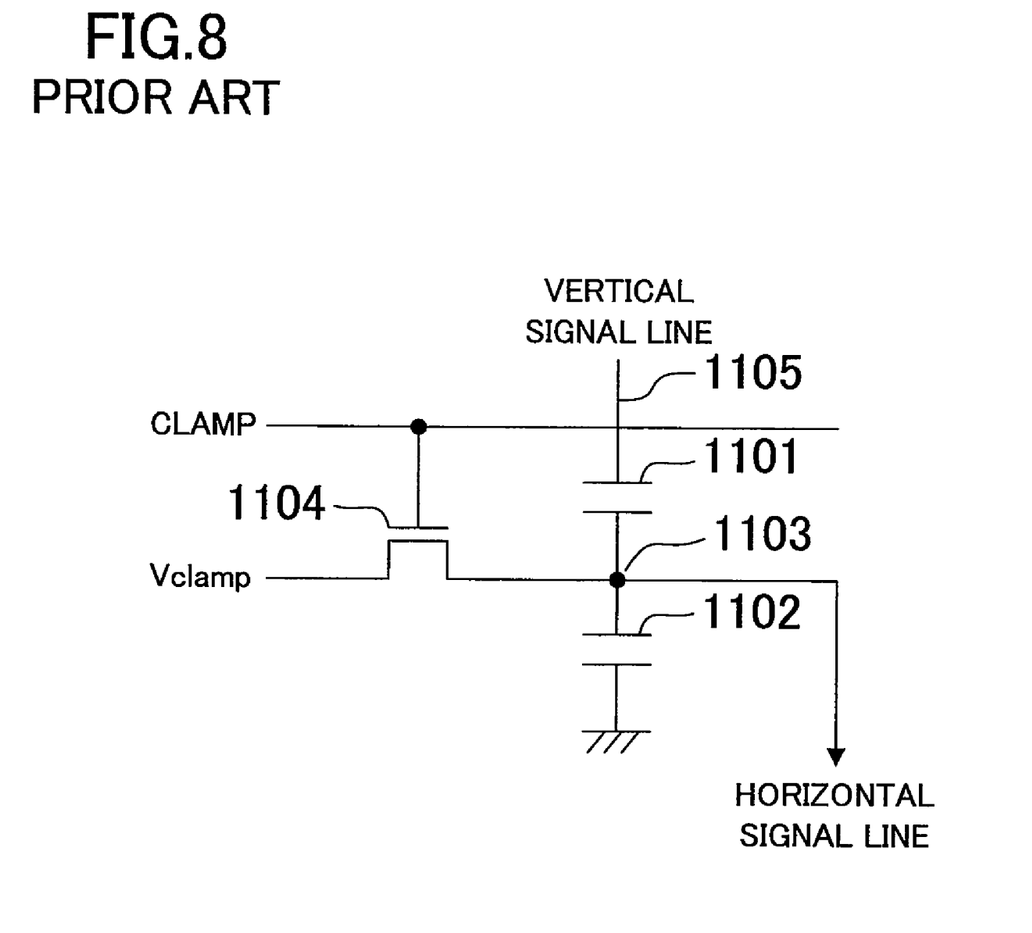
FIG. 8 illustrates high-brightness black crushing of an image in a conventional solid-state image sensor.

FIG. 8 is a diagram showing a structure of a common fixed-pattern-noise cancellation circuit. As shown in the figure, in the common fixed-pattern-noise cancellation circuit (FPN cancellation circuit), a clamp capacitive element 1101 having a capacitance value C1, and a sampling capacitor 1102 having a capacitance value C2 are connected in series with each other at one end of a vertical signal line 1105. A node 1103 between the clamp capacitive element 1101 and the sampling capacitor 1102 is an output node of the FPN cancellation circuit, and a reference power supply for supplying a reference voltage Vclamp is connected to the node 1103 through a switch 1104 formed by a transistor.

The FPN cancellation circuit has two phases. First, in a first phase, the switch 1104 is turned on to apply the reference voltage Vclamp to the node 1103. At this time, an FD is reset in a pixel, and the potential on the vertical signal line 1105 becomes Vrst, which is an amplified signal of a reset potential of the FD. Thus, charge Q1, which is held in the clamp capacitive element 1101, becomes "C1×(Vrst−Vclamp)," and charge Q2, which is held in the sampling capacitor 1102, becomes "C2×Vclamp."

Then, in a second phase, the switch 1104 is turned off. At this time, in the pixel, signal charge is transferred from a photodiode (PD) to the FD. Thus, the potential on the vertical signal line 1105 becomes Vsig, which is an amplified signal of the potential of the FD in the state where the signal charge generated in the PD has been transferred thereto. Provided that Vsh is a potential at the node 1103, charge Q1', which is held in the clamp capacitive element 1101, becomes "C1×(Vsig−Vsh)," and charge Q2', which is held in the sampling capacitor 1102, becomes "C2×Vsh." Since the total electric charge at the node 1103 is conserved, Q1+Q2=Q1'+Q2'. That is, the voltage Vsh at the node 1103 becomes "Vclamp−C1(Vrst−Vsig)/(C1+C2)."

Thus, a value, which is calculated by subtracting a product of the difference between the reset voltage Vrst and the signal voltage Vsig of the FD, and a voltage gain "C1/(C1+C2)" of the FPN cancellation circuit, from the reference voltage Vclamp, is an output voltage of the FPN cancellation circuit. Even if the value of Vrst varies, the magnitude of the amplitude of (Vrst−Vsig) does not vary. Thus, the use of the FPN cancellation circuit enables fixed pattern noise, which is generated by variation in Vrst, to be removed.

However, the use of this FPN cancellation circuit has a problem of black crushing, i.e., a problem that the pixel output becomes dark when a pixel receives bright light, such as sunlight and spotlight ("high-brightness black crushing").

Figure 9:
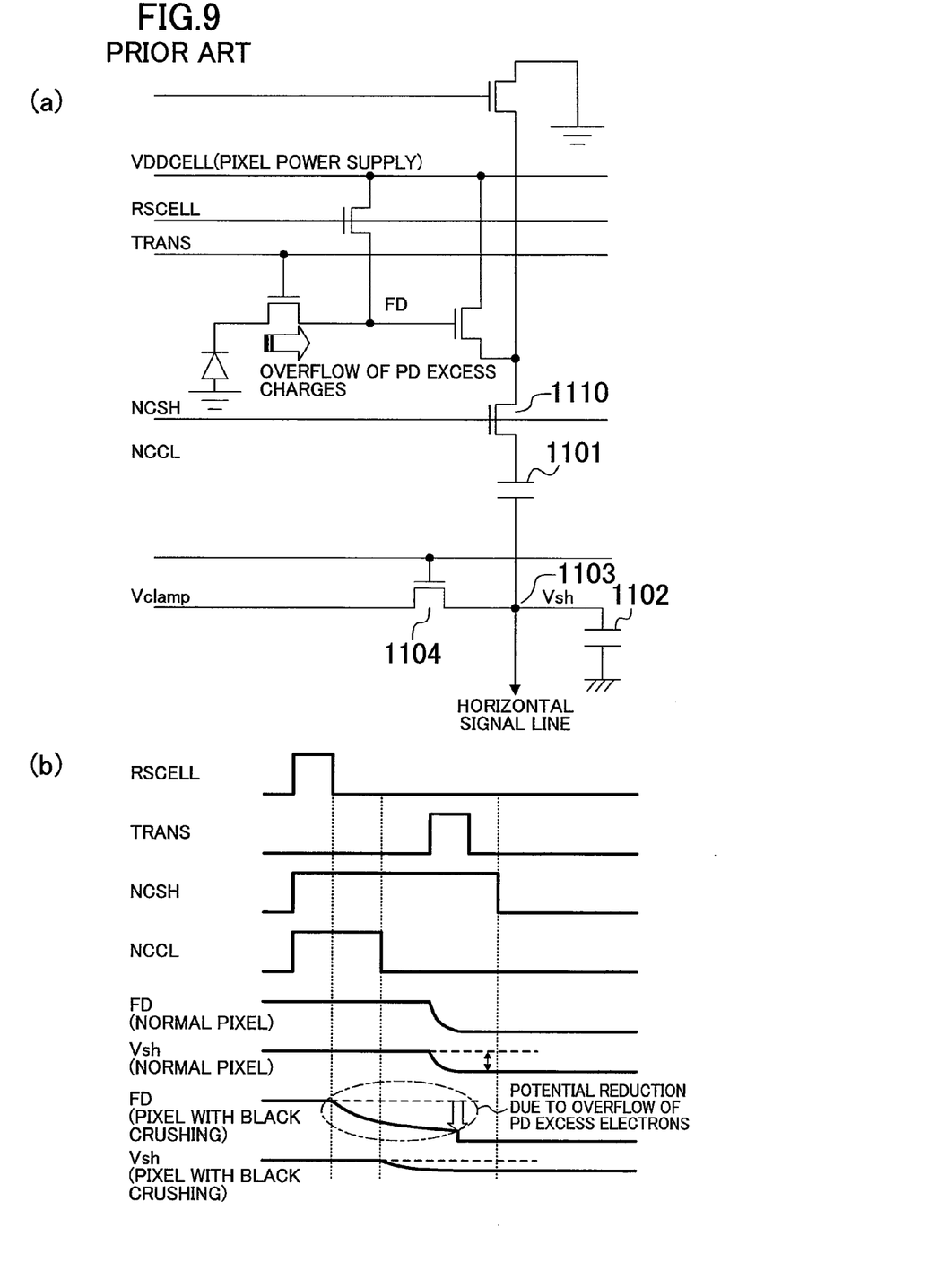
FIG. 9 shows an example of measures against high-brightness black crushing in a conventional solid-state image sensor.

FIG. 9(a) is a diagram showing a structure of a pixel circuit and an FPN cancellation circuit in a conventional solid-state image sensor, and FIG. 9(b) is a timing chart showing a potential change of various control signals, and FD and Vsh in the conventional solid-state image sensor.

The problem resulting from incidence of bright light will be described below with reference to FIGS. 9(a) and 9(b). In a pixel which has received bright light, signal charge generated and accumulated by a PD has been saturated, and excess signal charge, generated by further light incidence on the PD, overflows from the PD to an FD. Thus, the FD potential decreases when, or right after, the FD in the pixel is reset to a predetermined potential in the FPN cancellation operation described above, and the potential on the vertical signal line 1105, which is an amplified signal of the decreased FD potential, is replaced with the reference potential Vclamp of the FPN cancellation circuit. Then, the signal charge is read from the PD to the FD. However, since the FD potential decreases only to a certain level, the amplitude of (Vrst−Vsig) decreases, and the signal level at the output node of the FPN cancellation circuit becomes lower than the saturation signal level, although the PD has been saturated. This causes black crushing, i.e., a problem that the output of a part, which received bright light, becomes dark ("high-brightness black crushing"). The problem resulting from the incidence of bright light was described above.

Figure 10:
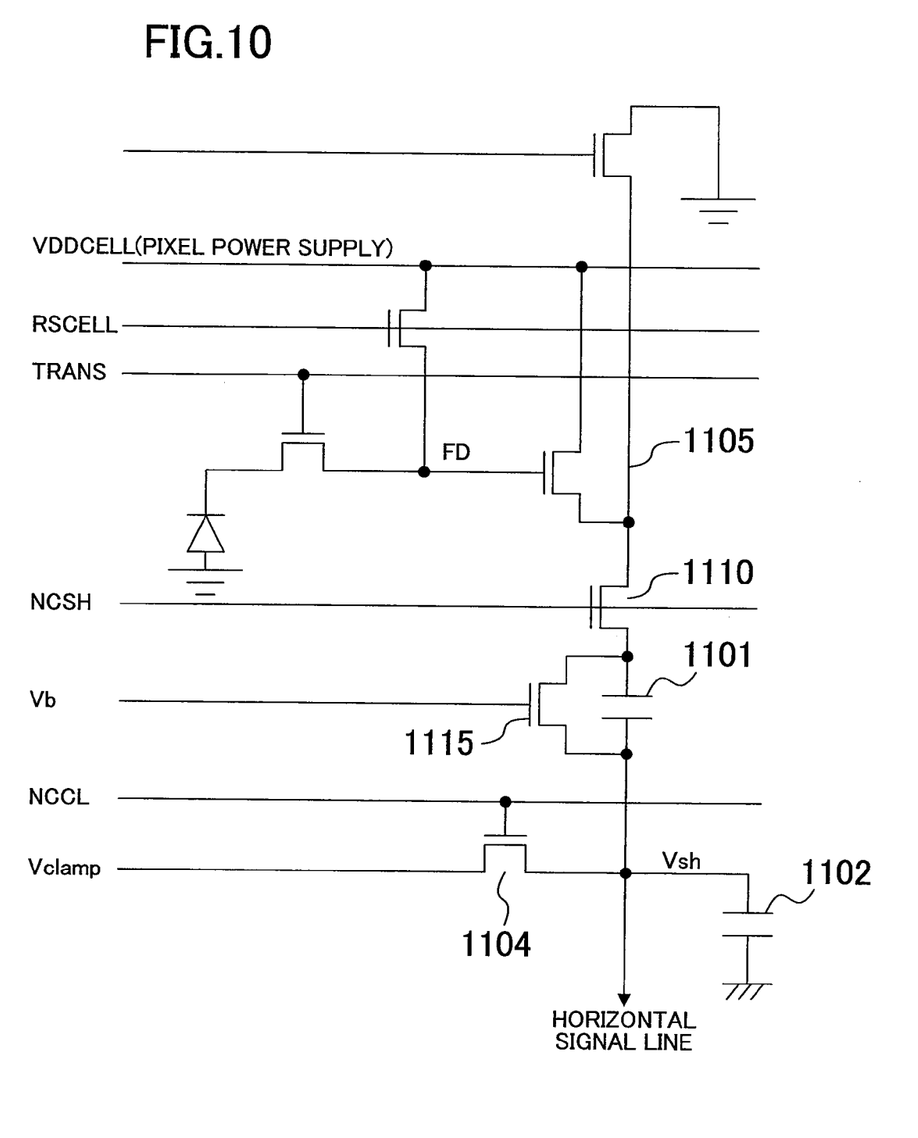
FIG. 10 is a structural diagram showing an example of a camera system in an embodiment of the present invention.

In order to prevent this problem, a technique of suppressing black crushing caused by incidence of bright light, is disclosed in a related art solid-state image sensor described in Patent Document 1. As shown in FIG. 10, this solid-state image sensor includes a bypass transistor 1115, which is provided in parallel with the clamp capacitor 1101 and receives a threshold voltage Vb at its gate electrode. Thus, when the voltage on the vertical signal line 1105 becomes lower than the voltage (Vb−Vth), the bypass transistor 1115 is turned on to write the voltage on the vertical signal line 1105 directly to the sampling capacitor 1102, thereby suppressing the black crushing due to the incidence of bright light.

Patent Document 1: Japanese Published Patent Application No. 2006-222708

DISCLOSURE OF THE INVENTION

Technical Problem

However, the bypass transistor 1115 of FIG. 10 has a first problem that the gate-source voltage becomes small when the voltage of the voltage signal line is close to (Vb−Vth), and the bypass transistor 1115 operates in a weak inversion region, resulting in poor time response.

Moreover, since a common threshold voltage is used for every pixel, a margin is required for variation in voltage on the vertical signal line 1105, which is caused by variation in transistor characteristics among pixels, and by reset noise. Thus, there has been a demand for measures against black crushing, which are less susceptible to such variation in voltage on the vertical signal line 1105, caused by variation in transistor characteristics among pixels, and by reset noise (second problem).

In view of the above problems, it is an object of the present invention to provide a solid-state image sensor, which has excellent time response, is less susceptible to variation in voltage on a vertical signal line, and has measures against black crushing, and a driving method thereof.

Solution to Problem

A solid-state image sensor according to an example of the present invention includes: photodiodes arranged in a matrix to form pixels, for generating signal charge according to intensity of incident light, and accumulating the generated signal charge therein; floating diffusions for holding the signal charge transferred from a corresponding one of the photodiodes; transfer transistors, each provided between a corresponding one of the photodiodes and a corresponding one of the floating diffusions; reset transistors, each having its drain connected to a power supply signal line, and its source connected to a corresponding one of the floating diffusions, for resetting the corresponding floating diffusion to a predetermined voltage; amplifying transistors for reading a voltage of a corresponding one of the floating diffusions; vertical signal lines provided in each column of the pixels, for receiving a signal from corresponding ones of the pixels; load transistors, each connected to a corresponding one of the vertical signal lines, and each forming a source follower circuit, together with a corresponding one of the amplifying transistors; clamp capacitors, each having a first terminal connected to a corresponding one of the vertical signal lines; sampling capacitors, each connected to a second terminal of a corresponding one of the clamp capacitors; clamp transistors, each having its drain connected to a first reference voltage, and its source connected to a corresponding one of the sampling capacitors; voltage comparison circuits, each connected in series with a corresponding one of the vertical signal lines; and clip circuits for outputting a clip voltage to a corresponding one of the sampling capacitors based on an output of a corresponding one of the voltage comparison circuits.

In the case where bright light is incident on a photodiode, a potential on a vertical signal line changes differently from the case where light having normal brightness is incident. Thus, by using the above structure, whether bright light was incident or not can be determined by, for example, comparing the voltage on the vertical signal line in the state where the signal accumulated in the photodiode has been transferred to the floating diffusion, with the voltage on the vertical signal line in the state where the floating diffusion is reset to the reference voltage through the reset transistor. Thus, since the voltage on the vertical signal line at a predetermined point can be used as the comparison voltage, the time response can be improved over the case where bypass transistors are used, and a threshold voltage, which is common to each column, is supplied to the gate electrodes of the bypass transistors. Moreover, since the determination of whether bright light was incident or not can be made in the state where variation in transistor characteristics among the pixels has been removed, the influence of the variation in voltage on the vertical signal line can be suppressed.

Note that a comparator circuit may be provided in each column of the plurality of pixels, as a circuit for performing the comparison operation. In the case where a column amplifier circuit is provided, the column amplifier circuit may be used as a comparator circuit.

Moreover, mounting the above solid-state image sensor on an image system such as a camera system can suppress generation of defects such as black crushing.

Moreover, a method for driving a solid-state image sensor according to the present invention is a method for driving a solid-state image sensor including: photodiodes arranged in a matrix to form pixels, for generating signal charge according to intensity of incident light, and accumulating the generated signal charge therein; floating diffusions for holding signal charge transferred from a corresponding one of the photodiodes; transfer transistors, each provided between a corresponding one of the photodiodes and a corresponding one of the floating diffusions; reset transistors, each having its drain connected to a power supply signal line, and its source connected to a corresponding one of the floating diffusions; amplifying transistors for reading a voltage of a corresponding one of the floating diffusions; vertical signal lines provided in each column of the pixels, for receiving a signal from corresponding ones of the pixels; load transistors, each connected to a corresponding one of the vertical signal lines, and each forming a source follower circuit, together with a corresponding one of the amplifying transistors; clamp capacitors, each having a first terminal connected to a corresponding one of the vertical signal lines; sampling capacitors, each connected to a second terminal of a corresponding one of the clamp capacitors; clamp transistors, each having its drain connected to a reference voltage, and its source connected to a corresponding one of the sampling capacitors; voltage comparison circuits, each connected in series with a corresponding one of the vertical signal lines; and clip circuits for outputting a clip voltage to a corresponding one of the sampling capacitors based on an output of a corresponding one of the voltage comparison circuits. The method includes the steps of: (a) turning on the transfer transistor to transfer a signal, accumulated in the photodiode, to the floating diffusion; (b) after the step (a), resetting the floating diffusion to a reference voltage through the reset transistor; and (c) after the step (b), by using, as a comparison voltage, a voltage on the vertical signal line in a state where the step (a) is completed, the voltage comparison circuit determines if a voltage on the vertical signal line in a state where the floating diffusion is reset to the reference voltage in the step (b), is higher or lower than the comparison voltage.

The above method improves the time response over conventional driving methods using bypass transistors. Moreover, since the determination of whether bright light was incident or not can be made in the state the variation in transistor characteristics among the pixels has been removed, the influence of variation in voltage on the vertical signal line can be suppressed.

Moreover, if it is determined that bright light was incident, generation of black crushing due to the bright light can be effectively suppressed by outputting, for example, a voltage (clip voltage) equal to a signal voltage at the time when a photodiode is saturated, or the like.

EFFECTS OF THE INVENTION

In the solid-state image sensor and the driving method thereof according to the present invention, a comparison voltage for determining incidence of bright light can be generated by the pixels themselves. This eliminates the need to provide a margin for variation in voltage on the vertical signal line (i.e., variation in voltage of the FD). Moreover, making the determination by the voltage comparison circuit can improve the time response.

Moreover, the image sensor of the present invention can reduce the overall size of a camera system (image sensor).

DESCRIPTION OF CHARACTERS 21, 131 pixel
22 vertical scanning unit
23, 133 signal processing unit
24 horizontal scanning unit
25 signal amplifying unit
31 vertical signal line
32 horizontal signal line
33 power supply signal line
34 transfer signal line
35 reset signal line
41 PD
42 FD
43 transfer transistor
44 reset transistor
45 amplifying transistor
51 load transistor
61, 86 clamp capacitor
62, 89 sampling capacitor
63, 87 sampling switch
67 clamp transistor
70, 88 node
71, 81, 85 capacitive element
72 inverter circuit
73, 74, 75 transistor
76, 92 clip transistor
78 comparator
79, 96 clip circuit
82 inverting amplifier circuit
83, 84, 90, 91 transistor
95 column amplifier circuit
97 clamp transistor
120 image sensor
121 MOS imaging element
123 image signal processing unit
133 signal processing unit
124 solid-state image sensor
126 optical member
127 timing control unit
135 high-brightness determination circuit
137 output circuit
139 correlated double sampling circuit CDS

BEST MODE FOR CARRYING OUT THE INVENTION

First Embodiment

Figure 1:
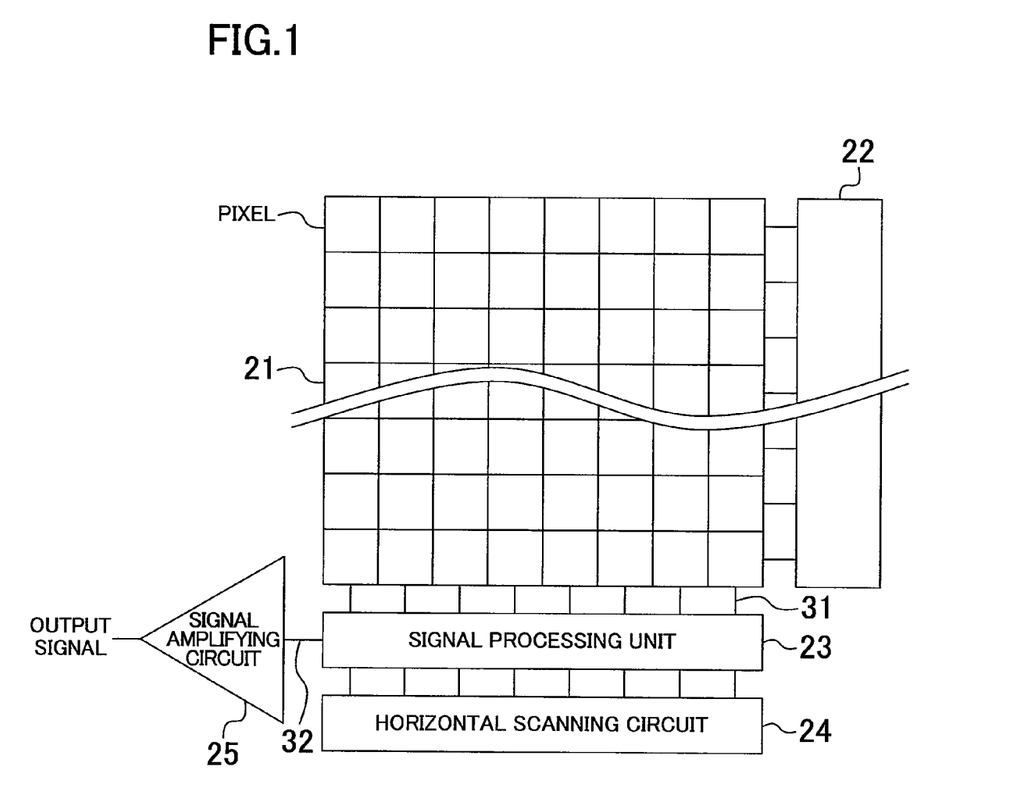
FIG. 1 is a block diagram showing a structure of a solid-state image sensor according to an embodiment and a modification of the present invention.

FIG. 1 is a block diagram showing a structure of a solid-state image sensor according to a first embodiment of the present invention.

As shown in the figure, the solid-state image sensor of the present embodiment includes a plurality of pixels 21 arranged in a matrix, a vertical scanning unit 22 for selecting the pixels 21 on a row-by-row basis, vertical signal lines 31 provided in each column, and each connected in common to the pixels 21 of a corresponding column, and a plurality of signal processing units 23 respectively connected to the vertical signal lines 31.

Each signal processing unit 23 is formed by a fixed-pattern-noise (FPN) cancellation circuit, a high-brightness determination circuit, and a clip circuit 79 (see FIG. 3), and a signal is sequentially outputted from each signal processing unit 23 to a horizontal signal line 32. A horizontal scanning unit 24 controls outputting of the signals from the signal processing units 23 to the horizontal signal line 32. A signal outputted to the horizontal signal line 32 is amplified by a signal amplifying unit 25 to be outputted as an image signal.

The high-brightness determination circuit compares the voltage on the vertical signal line 31, with the voltage on the vertical signal line 31 at the time when the potential of an FD 42 (see FIG. 2) is reset to a reference voltage through a reset transistor 44, and determines if high-brightness black crushing has occurred or not. The clip circuit 79 outputs a clip voltage to a sampling capacitor 62 based on the output of the high-brightness determination circuit.

Figure 2:
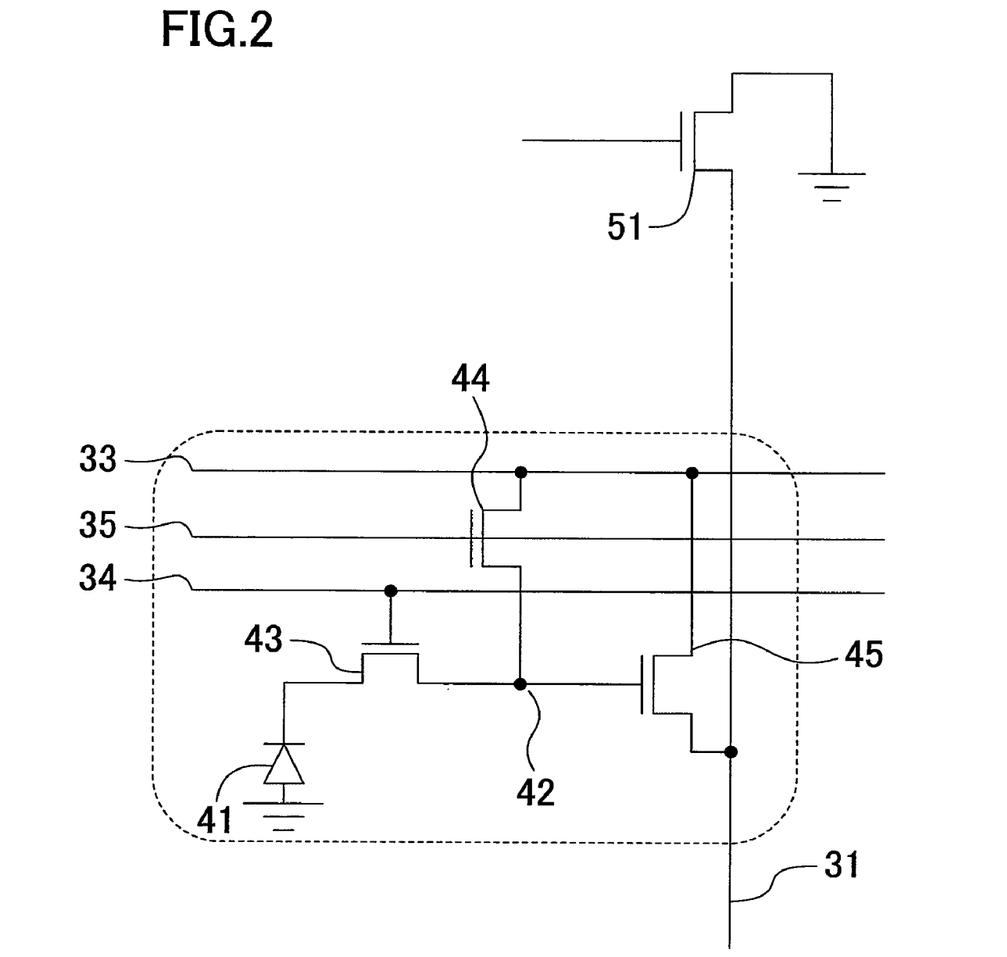
FIG. 2 is a circuit diagram showing a structure of a pixel of a solid-state image sensor according to an embodiment and a modification of the present invention.

Next, FIG. 2 is a circuit diagram showing details of a pixel circuit of the solid-state image sensor according to the present embodiment.

As shown in the figure, a pixel (pixel circuit) 21 has a photodiode (PD) 41 arranged in a matrix, and a floating diffusion (FD) 42 for accumulating signal charge transferred from the PD 41. A transfer transistor 43 is provided between the PD 41 and the FD 42, and a reset transistor 44 is provided between the FD 42 and a power supply signal line 33. A gate electrode of the transfer transistor 43 is connected to a transfer signal line 34, and a gate electrode of the reset transistor 44 is connected to a reset signal line 35. The FD 42 is connected to the gate of an amplifying transistor 45 connected between a vertical signal line 31 and the power supply signal line 33. The amplifying transistor 45 forms a source follower circuit, together with a load transistor 51 connected to the vertical signal line 31, and outputs a signal voltage according to the signal charge transferred from the PD 41 to the FD 42, to the vertical signal line 31.

Note that FIGS. 1 and 2 illustrate a case where a plurality of photodiodes share no transistor (such as a reset transistor, and an amplifying transistor). However, the solid-state image sensor of the present embodiment includes the case of a so-called "multi-pixel cell" structure, in which a plurality of photodiodes share transistors (such as a reset transistor, and an amplifying transistor).

Figure 3:
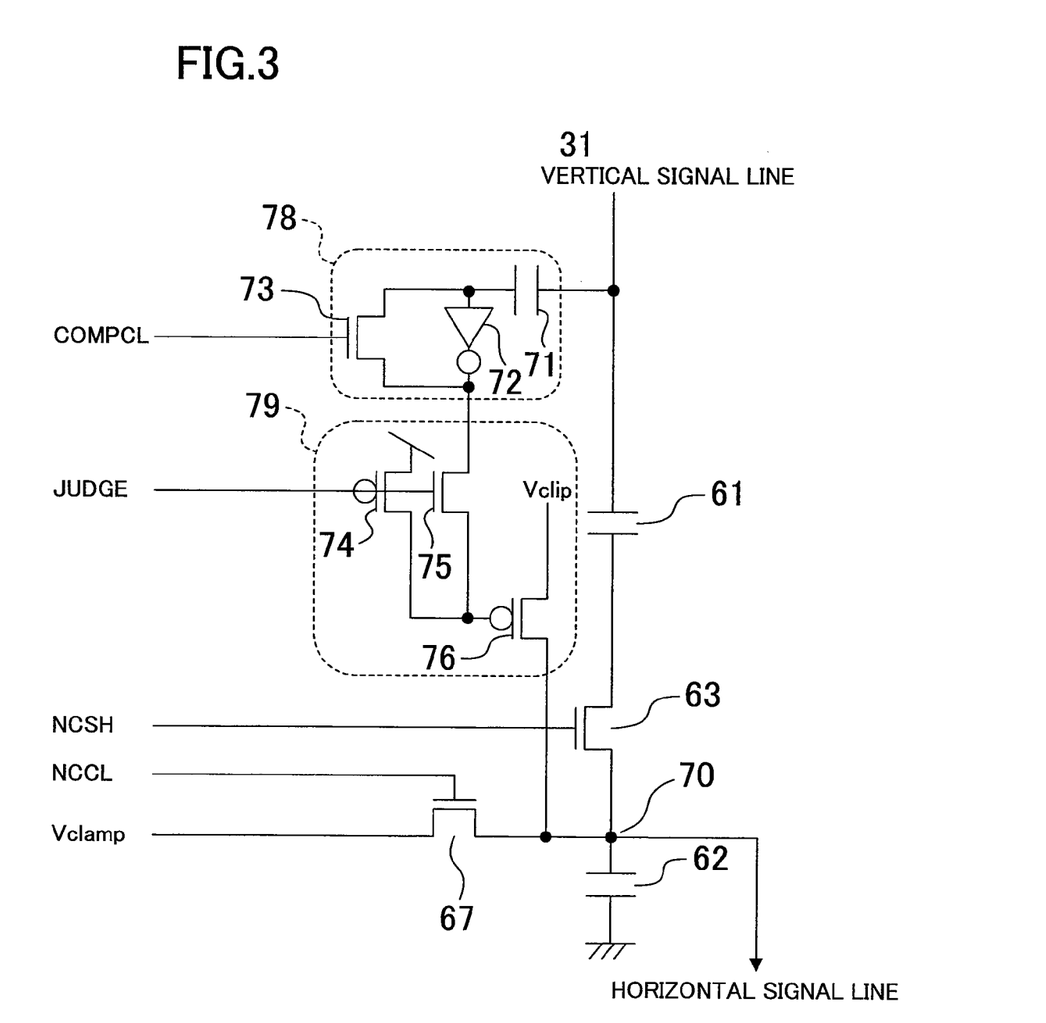
FIG. 3 is a circuit diagram showing a structure of a signal processing unit of a solid-state image sensor according to an embodiment of the present invention.

Next, FIG. 3 is a circuit diagram showing a signal processing unit 23 in the solid-state image sensor of the present embodiment. The figure shows an example in which a comparator 78 including an inverter 72 corresponds to the high-brightness determination circuit.

As shown in FIG. 3, the signal processing unit 23 of the present embodiment has, as a basic structure, a clamp capacitor 61 connected to a vertical signal line 31 and having a capacitance value C1, a sampling switch 63, and a sampling capacitor 62 having its one end (a first terminal) grounded, and the other end (a second terminal) connected to the clamp capacitor 61 through the sampling switch 63, and having a capacitance value C2. The clamp capacitor 61 and the sampling switch 63 are arranged in series on a path from the vertical signal line 31 to the ground.

Moreover, a reference power supply for supplying a fixed voltage Vclamp is connected through a clamp transistor 67 to a node 70, which is located between the sampling switch 63 and the second terminal of the sampling capacitor 62. Moreover, the comparator 78, which is formed by a capacitive element 71, an inverter circuit 72, and a transistor 73, is connected to the vertical signal line 31, and an output part of the comparator 78 is connected to the clip circuit 79, which is formed by transistors 74, 75 and a clip transistor 76. A fixed voltage Vclip is applied to one end of the clip transistor 76, and the node 70 is connected to the other end of the clip transistor 76. The comparator 78 and the clip circuit 79 are provided on every vertical signal line 31. Note that, in the example shown in FIG. 3, the above FPN cancellation circuit is formed by the clamp capacitor 61, the sampling switch 63, the clamp transistor 67, and the sampling capacitor 62.

FIG. 3 shows an example in which the sampling switch 63, the clamp transistor 67, and the transistors 73, 75 are n-channel MOS transistors, and the transistor 74 and the clip transistor 76 are p-channel MOS transistors. However, the conductivity type of the transistors may be changed as long as the structure having the same functions is implemented.

Figure 4:
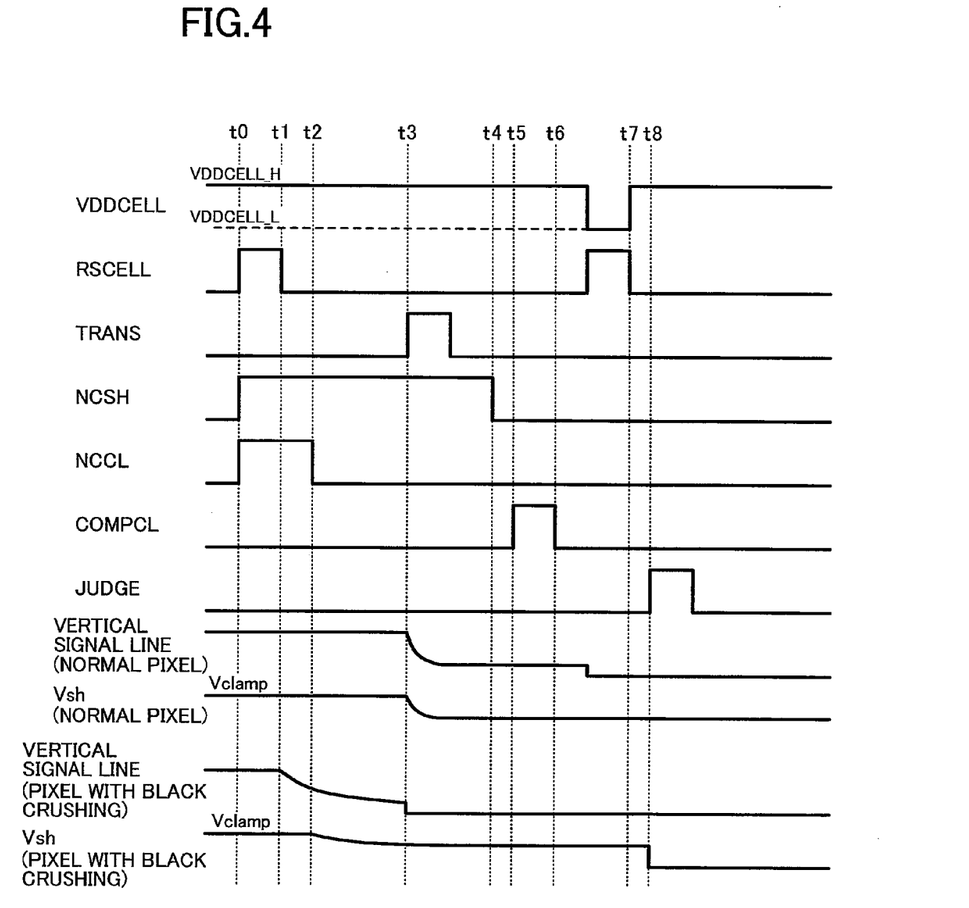
FIG. 4 is a timing chart illustrating an operation of a solid-state image sensor according to an embodiment of the present invention.

A driving method of the solid-state image sensor of the present embodiment will be described below. FIG. 4 is a timing chart showing a potential change of various signals for driving the solid-state image sensor of the present embodiment, and a potential change on the vertical signal line 31 and the node 70.

In FIG. 4, VDDCELL indicates a pulse for controlling the voltage of the FD 42 of a pixel. Moreover, RSCELL indicates a pulse for resetting the FD 42 of the pixel to the VDDCELL voltage. TRANS indicates a pulse for transferring signal charge from the PD 41 to the FD 42 of the pixel. NCSH indicates a pulse for holding an output signal of the pixel in the sampling capacitor 62 of the FPN cancellation circuit. NCCL indicates a pulse for resetting the sampling capacitor 62 of the FPN cancellation circuit to a reference voltage. COMPCL indicates a pulse for resetting the comparator circuit. Moreover, JUDGE indicates a pulse for determining if black crushing due to bright light has occurred or not. Note that wirings for supplying these signals are common to the vertical signal lines, the comparators 78, or the clip circuits 79 of each column.

As shown in FIG. 4, first, in the period of t0-t1, the reset transistor 44 in a pixel (see FIG. 2) is turned on to reset the potential of the FD 42 to High level (VDDCELL_H) of the pixel power supply voltage VDDCELL. Moreover, in the period of t0-t2, the clamp transistor 67 in the FPN cancellation circuit is turned on to replace the voltage of the FD 42, which has been read through the vertical signal line 31, with the reference voltage Vclamp of the FPN cancellation circuit at t2.

Then, at t3, the transfer transistor 43 in the pixel is turned on to transfer the charge, accumulated in the PD 41, to the FD 42. Then, at t4, the sampling switch 63 in the FPN cancellation circuit is turned off to hold "Vclamp−Vpd×C1/(C1+C2)," that is, a voltage calculated by subtracting voltage amplitude Vpd of the signal charge of the PD 41 from the reference voltage Vclamp, in the node 70 in the FPN cancellation circuit.

As described above, after the voltage signal, outputted from the pixel, is sampled in the sampling capacitor 62 in the FPN cancellation circuit, the transistor 73, serving as a switch of the comparator 78 connected to the vertical signal line 31, is turned on in the period of t5-t6, so that the voltage of the FD 42 at t6 is used as a comparison voltage of the comparator 78.

Then, at t7, the pixel power supply voltage VDDCELL is set to a reference voltage, and the reset transistor 44 is turned on to set the potential of the FD 42 to the reference voltage. Then, at t8, an operation of comparing the comparison voltage of the FD 42 at t6 (i.e., the voltage on the vertical signal line 31 at t6) and the voltage of the FD 42 at t8 (i.e., the voltage on the vertical signal line 31 at t8) is performed.

Thus, as shown in FIG. 4, the voltage of the FD 42 is lower at t7 than at t6 in a normal pixel (a pixel in which no high-brightness black crashing has occurred). Thus, the comparator outputs an inverted signal High, and the voltage Vsh of the node 70 at t8 becomes "Vclamp−Vpd×C1/(C1+C2)."

Moreover, in a pixel in which high-brightness black crushing has occurred, the voltage of the FD 42 at t6 is equal to, or lower than, that of the FD 42 at t7. Thus, the comparator 78 (see FIG. 3) outputs a Low signal, whereby the clip transistor 76 is turned on, and the voltage Vsh of the node 70 at t8 becomes a clip voltage Vclip.

As described above, according to the solid-state image sensor of the present embodiment, the voltage of the FD 42 after reading a signal in each pixel is compared with the voltage of the FD 42 when resetting the potential of the FD 42 to the reference voltage through the reset transistor 44. This eliminates the need to provide a margin for variation in transistor characteristics among the pixels. Moreover, generation of black crushing can be suppressed by replacing the output from a pixel which has received bright light, with a clip voltage corresponding to a pixel saturation signal.

As described above, the solid-state image sensor of the first embodiment of the present invention includes: a plurality of pixels, each having a PD 41 arranged in a matrix, for generating and accumulating signal charge according to the intensity of incident light, an FD 42 for reading and holding the signal charge accumulated in the PD 41, a transfer transistor 43 for transferring the signal of the PD 41 to the FD 42, a reset transistor 44 for resetting the FD 42 to a power supply voltage, and an amplifying transistor 45 for reading the voltage of the FD 42; a plurality of vertical signal lines 31 provided in each column, for receiving signals of the pixels of a corresponding column; FPN cancellation circuits respectively connected to the vertical signal lines 31, for holding a signal from which the fixed pattern noise generated in each pixel has been removed, in a corresponding sampling capacitor 62; high-brightness determination circuits for comparing the voltage on a corresponding vertical signal line 31 after transferring the signal charge generated and accumulated in the PD 41 to the FD 42, with the voltage on the vertical signal line 31 when setting the potential of the FD 42 to Low level through the reset transistor 44, and for determining if high-brightness black crushing has occurred or not; and clip circuits 79 for outputting a clip voltage to a corresponding sampling capacitor 62 based on the output of a corresponding high-brightness determining circuit. A horizontal select transistor, for sequentially reading the signals held in the sampling capacitors 62 to a horizontal common signal line according to a column select signal, is connected to the sampling capacitors 62.

Moreover, the power supply signal line 33 is connected to the respective drains of the reset transistor 44 and the amplifying transistor 45 of each pixel, and this power supply signal line 33 can be driven by pulses. This power supply signal line 33 may be controlled by an external circuit of the solid-state image sensor.

With the above structure, in the solid-state image sensor and the driving method thereof according to the present embodiment, whether high-brightness black crushing has occurred or not can be determined by comparing the voltage on the vertical signal line 31 after reading a signal from the pixel, with the voltage on the vertical signal line 31 when setting the FD 42 to the reference voltage.

Moreover, in the case where no high-brightness black crushing has occurred, the voltage on the vertical signal line 31 (the voltage of the FD 42) after reading a signal is different from that on the vertical signal line 31 after resetting the FD 42. Thus, the high-brightness determination circuit determines that no black crushing has occurred, and outputs no clip voltage to the sampling capacitor 62. On the other hand, in the case where high-brightness black crushing has occurred, the voltage on the vertical signal line 31 (the voltage of the FD 42) after reading a signal does not vary from the voltage on the vertical signal line 31 after resetting the FD 42. Thus, the high-brightness determination circuit determines that black crushing has occurred, and the clip circuit 79 can output a voltage (a clip voltage) corresponding to a pixel saturation signal, to the sampling capacitor 62.

In other words, since the solid-state image sensor of the present embodiment includes the comparators 78 for comparing the potential of the FD 42 of each pixel, no vias voltage generation circuit for generating a threshold voltage is required to determine if black crushing has occurred or not. The solid-state image sensor of the present embodiment is less susceptible to variation in threshold value of the amplifying transistor 45, and to reset noise of the FD 42, and thus, has solved the second problem of the related art.

Moreover, in the solid-state image sensor of the present embodiment, the comparator 78 is provided in every column to determine if black crushing has occurred or not. This can improve the frequency characteristics, and also improves the time response, which was the first problem of the related art, whereby black crushing can be quickly suppressed.

Note that the solid-state image sensor of the present embodiment is configured to set the potential of the FD 42 to the reference voltage through the reset transistor 44 in each pixel. However, a P-channel or N-channel transistor, which has its source connected to the FD 42 and its drain connected to the reference voltage, and is connected in parallel with the reset transistor 44, may be separately provided in each pixel, so that whether high-brightness black crushing has occurred or not can be detected by comparing the FD voltage of the pixel.

Note that row select transistors in the pixels are omitted in the solid-state image sensor of the present embodiment. However, even if the solid-state image sensor include the row select transistors, whether high-brightness black crushing has occurred or not can be determined by driving the pixel power supply, connected to the drains of the reset transistors 44, by pulses, and comparing the voltage on the vertical signal line (the FD voltage of the pixel) as described above.

Second Embodiment

Figure 5:
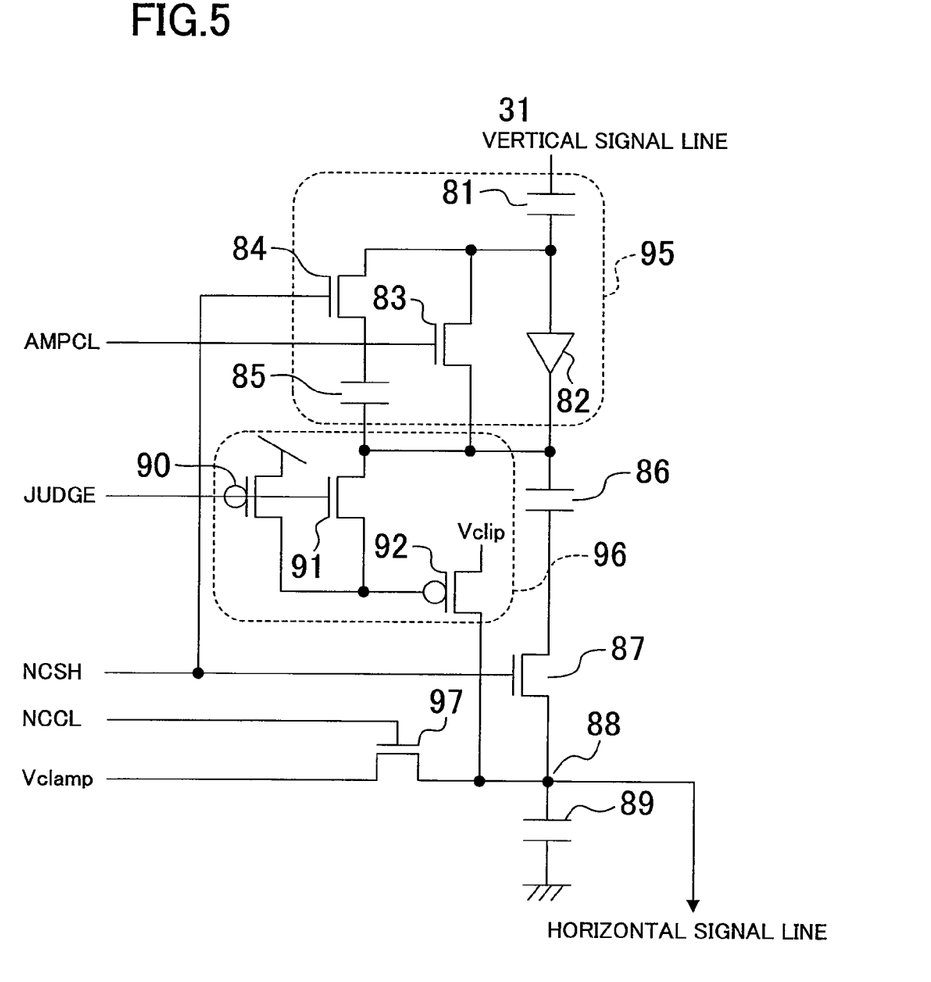
FIG. 5 is a circuit diagram showing a structure of a signal processing unit of a solid-state image sensor according to a modification of an embodiment of the present invention.

FIG. 5 is a circuit diagram showing a signal processing circuit in a solid-state image sensor according to a second embodiment of the present invention. The structure of the second embodiment, such as the structure of the pixel circuit and the basic structure of the solid-state image sensor as shown in FIGS. 1 and 2, is the same as that of the second embodiment except for the signal processing circuit. Thus, the following description focuses on characteristics of the signal processing circuit.

As shown in FIG. 5, the signal processing unit of the present embodiment has a clamp capacitor 86 which is connected to the vertical signal line 31 through a column amplifier circuit 95, and a sampling capacitor 89 which has its one end (a first terminal) grounded, and is connected in series with a capacitive element 81 and the clamp capacitor 86, on a path from the vertical signal line 31 to the ground.

The column amplifier circuit 95 is formed by a capacitive element 81, an inverting amplifier circuit 82 having its input part connected to the capacitive element 81 and its output part connected to the clamp capacitor 86, a transistor 83 provided between the input part and the output part of the inverting amplifier circuit 82, and a transistor 84 and a capacitive element 85 which are provided between the input part and the output part of the inverting amplifying circuit 82, and are connected in series with each other. (One end of) the clamp capacitor 86 is connected to an output part of the column amplifier circuit 95, and a sampling switch 87, formed by a MOS transistor, is connected between the other end of the clamp capacitor 86 and the sampling capacitor 89. The sampling capacitor 89 is connected to a node 88 between the sampling switch 87 and the sampling capacitor 89, and a reference power supply Vclamp is connected through a clamp transistor 97 to the node 88. The output part of the column amplifier circuit 95 is connected to a clip circuit 96 which is formed by transistors 90, 91 and a clip transistor 92. The structure of the clip circuit 96 is the same as that in the solid-state image sensor of the first embodiment.

As shown in FIG. 5, a feature of the signal processing portion of the present embodiment is that a signal amplifying circuit (column amplifier circuit 95) is provided on each vertical signal line 31 in order to amplify a signal outputted from each pixel, and to improve the S/N ratio.

Figure 6:
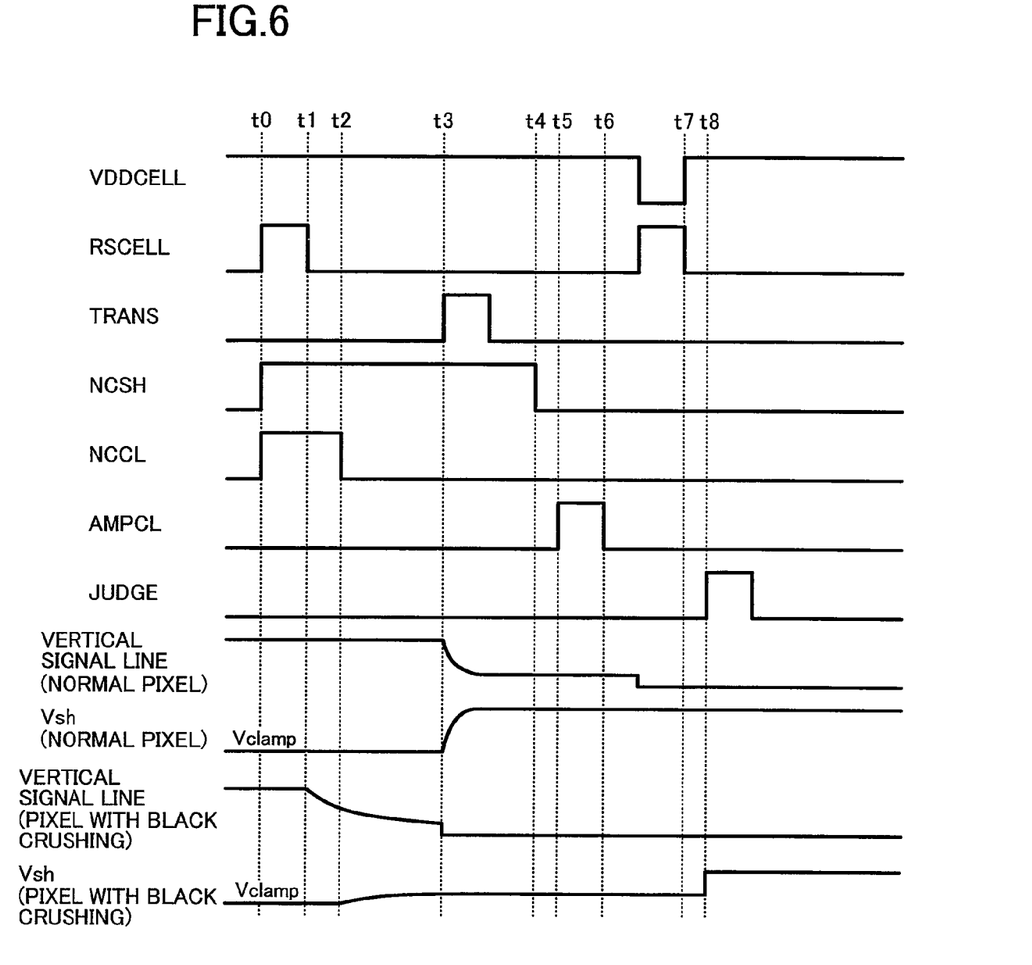
FIG. 6 is a timing chart illustrating an operation of a solid-state image sensor according to a modification of an embodiment of the present invention.

A driving method of the solid-state image sensor according to the second embodiment will be described below. FIG. 6 is a timing chart showing a potential change of various signals for driving the solid-state image sensor of the present embodiment, and a potential (Vsh) change on the vertical signal line 31 and the node 88.

In the figure, VDDCELL indicates a pulse for controlling the voltage of the FD 42 of a pixel. Moreover, RSCELL indicates a pulse for resetting the FD 42 (see FIG. 2) of the pixel to the VDDCELL voltage. TRANS indicates a pulse for transferring signal charge from the PD 41 to the FD 42 of the pixel. NCSH indicates a pulse for holding an output signal of the pixel in the sampling capacitor 89 of the FPN cancellation circuit. NCSH is applied not only to the gate electrode of the sampling switch 87, but also to the gate electrode of the transistor 84. The FPN cancellation circuit includes the clamp capacitor 86, the sampling switch 87, the clamp transistor 97, and the sampling capacitor 89.

Moreover, NCCL indicates a pulse for resetting the sampling capacitor 89 of the FPN cancellation circuit to a reference voltage. AMPCL indicates a pulse for resetting the column amplifier circuit 95. JUDGE indicates a pulse for determining if black crushing due to bright light has occurred or not.

As shown in FIG. 6, first, in the period of t0-t1, the reset transistor 44 in a pixel (see FIG. 2) is turned on to reset the potential of the FD 42 to the pixel power supply voltage VDDCELL_H, as described in the first embodiment.

Then, at t2, the clamp transistor 97 in the FPN cancellation circuit is turned on to replace the voltage of the FD 42, which was read through the vertical signal line 31, with the reference voltage Vclamp of the FPN cancellation circuit.

Then, at t3, the transfer transistor 43 in the pixel is similarly turned on to transfer the charge, accumulated in the PD 41, to the FD 42. Then, at t4, the sampling switch 87 in the FPN cancellation circuit is turned off. Thus, an applied voltage to the node 88 becomes a voltage calculated by adding "A×Vpd," which is an amplified signal of the voltage amplitude of the signal charge of the PD 41 by an amplification factor "A" of the column amplifier, to the reference voltage Vclamp. At this time, the voltage "Vclamp+C1/(C1+C2)×A×Vpd" is held in the node 88 of the FPN cancellation circuit.

Then, after the signal, outputted from the pixel, is sampled in the sampling capacitor 89 in the FPN cancellation circuit at t4, the transistor 84, serving as a switch, is turned off to switch the column amplifier circuit 95, structured as a closed loop, to an open loop structure, so that the column amplifier circuit 95 is used as a high gain comparator circuit.

Then, in the period of t5-t6, the column amplifier circuit (comparison circuit) 95 is reset to use the voltage of the FD 42 (the voltage on the vertical signal line 31) at t6 as a comparison voltage of the comparison circuit.

Then, at t7 (in the period of t6-t7 in the example of FIG. 6), the pixel power supply voltage VDDCELL is set to a reference voltage, and the gate of the reset transistor 44 is turned on to set the potential of the FD 42 to the reference voltage. Thus, an operation of comparing the voltage of the FD 42 with the above voltage of the FD 42 at t6 (the comparison voltage) is performed.

Thus, in the solid-state image sensor and the driving method thereof according to the present embodiment, the voltage of the FD 42 is lower at t7 than at t6 in a normal pixel (a pixel in which no high-brightness black crashing has occurred), as described above with reference to FIG. 6. Thus, the column amplifier circuit 95 outputs an inverted signal High, and the voltage at the node 88 becomes (Vclamp+C1/(C1+C2)×A×Vpd).

On the other hand, in a pixel in which high-brightness black crushing has occurred, the voltage of the FD 42 at t6 is equal to, or lower than, that of the FD 42 at t7. Thus, the column amplifier circuit 95 outputs a Low signal, whereby the clip transistor 92 is turned on, and the voltage of the node 88 becomes a clip voltage Vclip.

Thus, by comparing the voltage of the FD after reading a signal in each pixel, with the voltage of the FD when resetting the potential of the FD to the reference voltage through the reset transistor, high-brightness black crushing can be suppressed without the need to provide a margin for variation in transistor characteristics among the pixels.

That is, in the solid-state image sensor and the driving method thereof according to the present embodiment, the threshold voltage for determining if black crushing has occurred or not can be generated in each pixel, and this can reduce the influence of the fixed pattern noise which is generated by variation in Vth of the amplifying transistor provided in the pixel, and by the FD reset noise.

As described above, the solid-state image sensor of the second embodiment of the present invention includes: a plurality of pixels, each having a PD 41 (see FIG. 2) arranged in a matrix, for generating and accumulating signal charge according to the intensity of incident light, an FD 42 for reading and holding the signal charge accumulated in the PD 41, a transfer transistor 43 for transferring the signal of the PD 41 to the FD 42, a reset transistor 44 for resetting the FD 42 to a power supply voltage, and an amplifying transistor 45 for reading the voltage of the FD 42; a plurality of vertical signal lines 31 provided in each column, for receiving signals of the pixels of a corresponding column; FPN cancellation circuits respectively connected to the vertical signal lines 31, for holding a signal from which the fixed pattern noise generated in each pixel has been removed, in a corresponding sampling capacitor 87; high-brightness determination circuits for comparing the voltage on a corresponding vertical signal line 31 after transferring the signal charge generated and accumulated in the PD 41 to the FD 42, with the voltage on the vertical signal line 31 when setting the potential of the FD 42 to a reference voltage through the reset transistor 44, and for determining if high-brightness black crushing has occurred or not; and clip circuits 96 for outputting a clip voltage to a corresponding sampling capacitor 89 based on the output of a corresponding high-brightness determining circuit. FIG. 5 shows the case where the column amplifier circuit 95 is used as an example of the high-brightness determination circuit. However, a circuit other than the column amplifier circuit may be used as long as the circuit has similar functions. Moreover, a horizontal select transistor, for sequentially reading the signals held in the sampling capacitors to a horizontal common signal line according to a column select signal, is connected to the sampling capacitors.

Moreover, the power supply signal line 33 is connected to the respective drains of the reset transistor 44 and the amplifying transistor 45 of each pixel, and this power supply signal line 33 can be driven by pulses.

With the above structure, in the solid-state image sensor and the driving method thereof according to the present embodiment, whether high-brightness black crushing has occurred or not can be determined by comparing the voltage on the vertical signal line 31 after reading a signal from the pixel, with the voltage on the vertical signal line 31 when setting the FD 42 to the reference voltage.

Moreover, in the case where no high-brightness black crushing has occurred, the voltage on the vertical signal line 31 (the voltage of the FD 42) after reading a signal is different from that on the vertical signal line 31 after resetting the FD 42. Thus, the high-brightness determination circuit determines that no black crushing has occurred, and outputs no clip voltage to the sampling capacitor 89. On the other hand, in the case where high-brightness black crushing has occurred, the voltage on the vertical signal line 31 (the voltage of the FD 42) after reading a signal does not vary from the voltage on the vertical signal line 31 after resetting the FD 42. Thus, the high-brightness determination circuit determines that black crushing has occurred, and the clip circuit can output a voltage (a clip voltage) corresponding to a pixel saturation signal, to the sampling capacitor.

In other words, as in the first embodiment, the solid-state image sensor of the present embodiment includes the high-brightness determination circuits for comparing the potential of the FD 42 of each pixel. Thus, the solid-state image sensor of the present embodiment is less susceptible to variation in threshold value of the amplifying transistor 45, and to reset noise of the FD 42, and thus, has solved the second problem of the related art.

Moreover, in the solid-state image sensor of the second embodiment of the present invention, the column amplifier circuit 95, which is provided in every column, is used as a comparator. This can improve the frequency characteristics, and also, can improve the time response, which was the first problem of the related art.

Note that, in some cases, a column amplifier circuit is mounted in order to implement a high S/N ratio or the like. However, since the column amplifier circuit 95 can be used as the high-brightness determination circuit (comparator circuit) in the solid-state image sensor of the present embodiment, the circuit size can be reduced while implementing a high S/N ratio.

Note that the solid-state image sensor of the present embodiment is configured to set the potential of the FD 42 to the reference voltage through the reset transistor 44 in each pixel. However, a transistor, having its source connected to the FD 42 and its drain connected to the reference voltage power source, may be separately provided in each pixel, so that whether high-brightness black crushing has occurred or not can be detected by comparing the FD voltage of the pixel.

Note that row select transistors in the pixels are omitted in the solid-state image sensor of the present embodiment. However, even if the solid-state image sensor include the row select transistors, whether high-brightness black crushing has occurred or not can be determined by driving the pixel power supply, connected to the drains of the reset transistors 44, by pulses, and comparing the voltage on the vertical signal line (the FD voltage of the pixel) as described above.

Third Embodiment

Figure 7:
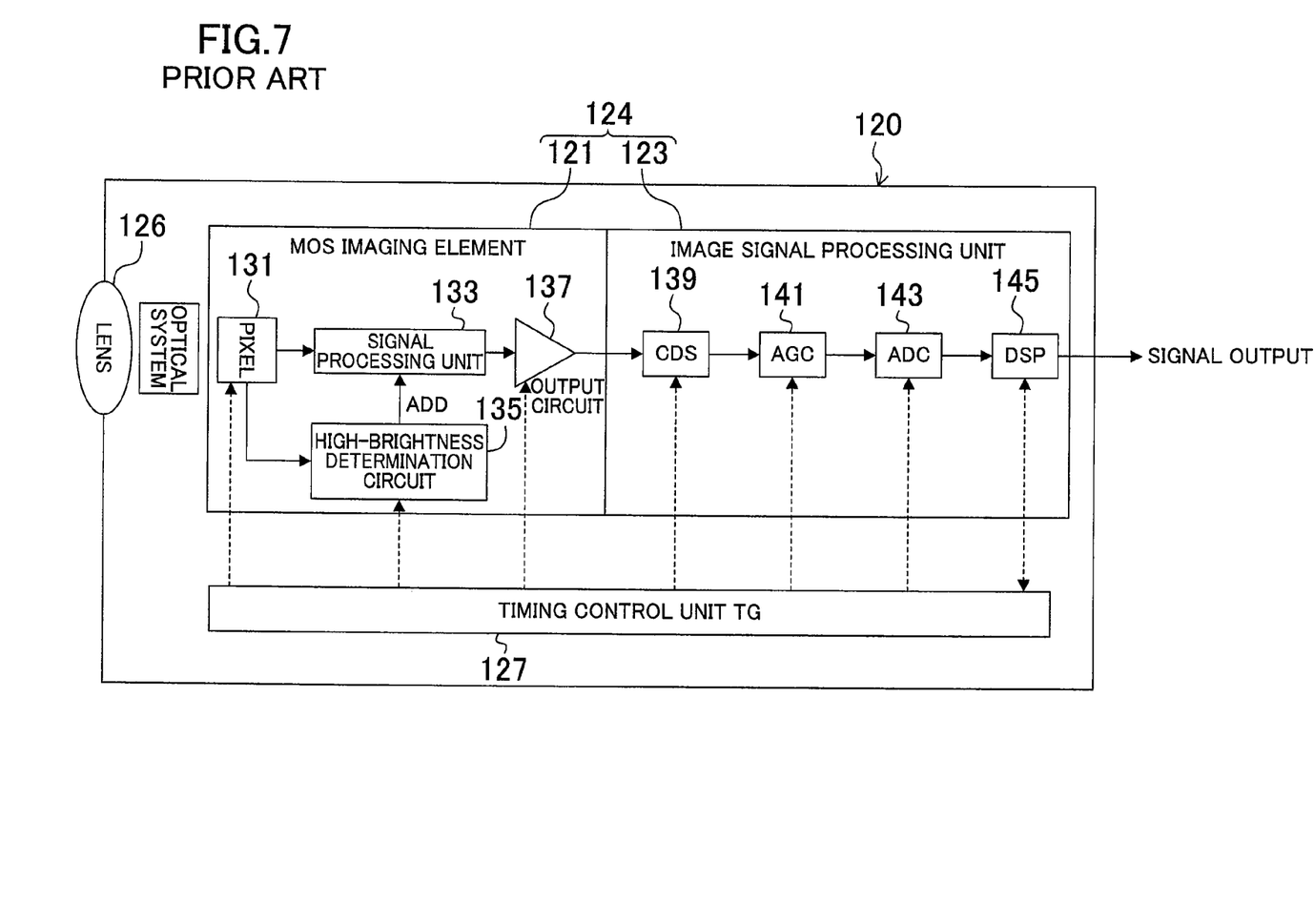
FIG. 7 is a circuit diagram showing a basic structure of a conventional FPN cancellation circuit.

FIG. 7 is a diagram showing an image sensor (camera system) according to a third embodiment of the present invention.

As shown in the figure, an image sensor 120 of the present embodiment includes an optical member (lens) 126 for collecting external light, a MOS solid-state image sensor 124 of the first or second embodiment of the present invention, and a timing control unit 127 for controlling the operation timing of the circuits in the solid-state image sensor 124.

FIG. 7 shows an example in which the solid-state image sensor 124 has a MOS imaging element 121 for converting light, which is incident through the optical member 126, to an image signal, and outputting the image signal, and an image signal processing unit 123 for processing the image signal outputted from the MOS imaging element 121, and outputting the resultant signal to external equipments such as a display device. The MOS imaging element 121 and the image signal processing unit 123 are formed on the same semiconductor chip, but may be formed on separate semiconductor chips.

The solid-state image sensor of the first or second embodiment of the present invention is used as the solid-state image sensor 124. Thus, the MOS imaging element 121 has pixels 131 for converting incident light to a voltage signal, a signal processing unit 133 for processing a signal outputted from each pixel 131, a high-brightness determination circuit 135 for receiving the signal from each pixel 131, and determining if bright light was incident on each pixel 131 or not, and an output circuit 137 for outputting a signal outputted from the signal processing unit 133, as an image signal. Although each circuit in the MOS imaging element 121 is the same as each circuit in the solid-state image sensor of the first or second embodiment, FIG. 7 shows an example in which the high-brightness determination circuit 135 is provided outside the signal processing unit 133. Moreover, although FIG. 7 shows an example in which the image signal processing unit 123 is provided inside the solid-state image sensor 124, the image signal processing unit 123 may be provided separately from the solid-state image sensor.

The image signal processing unit 123 has a correlated double sampling circuit (CDS 139) for receiving an image signal from the output circuit 137, an AGC (Auto Gain Control) 141, an ADC (Analog Digital Converter) 143, and a DSP (Digital Signal Processor) 145. The image signal processing unit 123 transmits and receives signals to and from the timing control unit 127. That is, the timing control unit 127 transmits and receives (transfers) signals to and from the MOS imaging element 121 and the image signal processing unit 123.

When bright light is incident on the pixel 131 in the image sensor of the present embodiment, the high-brightness determination circuit can make the determination based on the signal from the pixel 131, and can output a voltage corresponding to a pixel saturation signal to the signal processing unit 133. Thus, generation of black crushing can be effectively suppressed. Moreover, since a bias voltage generation circuit can be omitted, the size of the solid-state image sensor can be reduced, and the overall size of the camera system can be reduced. Moreover, the MOS imaging element 121 and the image signal processing unit 123 (the solid-state image sensor 124 and the image signal processing unit 123, in the case where the image signal processing unit 123 is provided outside the solid-state image sensor 124) transmit and receive signals to and from the common timing control unit 127, the overall size of the camera system (the image sensor) can be reduced.

INDUSTRIAL APPLICABILITY

The solid-state image sensor and the driving method thereof according to the present invention are capable of suppressing black crushing of an image when bright light is incident, and are useful as a solid-state image sensor and a driving method thereof, and the like.

The invention claimed is:

1. A solid-state image sensor, comprising:
    photodiodes arranged in a matrix to form pixels, for generating signal charge according to intensity of incident light, and accumulating the generated signal charge therein;
    floating diffusions for holding the signal charge transferred from a corresponding one of the photodiodes;
    transfer transistors, each provided between a corresponding one of the photodiodes and a corresponding one of the floating diffusions;
    reset transistors, each having its drain connected to a power supply signal line, and its source connected to a corresponding one of the floating diffusions, for resetting the corresponding floating diffusion to a predetermined voltage;
    amplifying transistors for reading a voltage of a corresponding one of the floating diffusions;
    vertical signal lines provided in each column of the pixels, for receiving a signal from corresponding ones of the pixels;
    load transistors, each connected to a corresponding one of the vertical signal lines, and each forming a source follower circuit, together with a corresponding one of the amplifying transistors;
    clamp capacitors, each having a first terminal connected to a corresponding one of the vertical signal lines;
    sampling capacitors, each connected to a second terminal of a corresponding one of the clamp capacitors;
    clamp transistors, each having its drain connected to a first reference voltage, and its source connected to a corresponding one of the sampling capacitors;
    voltage comparison circuits, each connected in series with a corresponding one of the vertical signal lines; and clip circuits for outputting a clip voltage to a corresponding one of the sampling capacitors based on an output of a corresponding one of the voltage comparison circuits.

2. The solid-state image sensor of claim 1, wherein each of the voltage comparison circuits compares a voltage on the vertical signal line in a state where a signal accumulated in the photodiode has been transferred to the floating diffusion, with a voltage on the vertical signal line in a state in which the floating diffusion has been reset through the reset transistor.

3. The solid-state image sensor of claim 1, wherein when each of the voltage comparison circuits performs a comparison operation, the floating diffusion is set to a reference voltage through the reset transistor by supplying a pulse to the power supply signal line.

4. The solid-state image sensor of claim 1, wherein each of the pixels has a first transistor, having its drain connected to the floating diffusion, and receiving the reference voltage at its source, and
when each of the voltage comparison circuits performs a comparison operation, the floating diffusion is set to the reference voltage through the first transistor.

5. The solid-state image sensor of claim 3, wherein the reference voltage of the power supply signal line is controllable by an external circuit.

6. The solid-state image sensor of claim 1, wherein each of the voltage comparison circuits is a comparator circuit which is formed by an inverting amplifier circuit.

7. The solid-state image sensor of claim 1, wherein each of the voltage comparison circuits is a column amplifier circuit provided between the vertical signal line and the clamp capacitor of a corresponding column, for amplifying a voltage on the vertical signal line.

8. The solid-state image sensor of claim 6, wherein the column amplifier circuit includes
a first capacitive element having a first terminal connected to the vertical signal line,
a signal amplifying circuit provided between a second terminal of the first capacitive element and the clamp capacitor,
a second transistor provided between an input part and an output part of the signal amplifying circuit, and
a switch transistor and a second capacitive element, which are provided between the input part and the output part of the signal amplifying circuit, and are connected in series with each other.

9. The solid-state image sensor of claim 8, wherein the switch transistor is turned on when the column amplifying circuit amplifies a signal, and
the switch transistor is turned off when the column amplifying circuit performs a comparison operation.

10. The solid-state image sensor of claim 8, wherein the column amplifier circuit turns on the second transistor after the signal charge generated and accumulated in the photodiode are transferred to the floating diffusion, in order to use a voltage on the vertical signal line at the time when the signal charge is transferred, as a comparison voltage, and
the column amplifier circuit then turns off the clamp transistor to reset the floating diffusion to the reference voltage, and compares the comparison voltage with a voltage on the vertical signal line at the time when the floating diffusion is reset to the reference voltage.

11. The solid-state image sensor of claim 1, wherein the clip voltage has a same signal level as that applied to the sampling capacitor when the photodiode is saturated.

12. An image sensor, comprising:
photodiodes arranged in a matrix to form pixels, for generating signal charge according to intensity of incident light, and accumulating the generated signal charge therein;
floating diffusions for holding the signal charge transferred from a corresponding one of the photodiodes;
transfer transistors, each provided between a corresponding one of the photodiodes and a corresponding one of the floating diffusions;
reset transistors, each having its drain connected to a power supply signal line, and its source connected to a corresponding one of the floating diffusions, for resetting the corresponding floating diffusion to a predetermined voltage;
amplifying transistors for reading a voltage of a corresponding one of the floating diffusions;
vertical signal lines provided in each column of the pixels, for receiving a signal from corresponding ones of the pixels;
load transistors, each connected to a corresponding one of the vertical signal lines, and each forming a source follower circuit, together with a corresponding one of the amplifying transistors;
clamp capacitors, each having a first terminal connected to a corresponding one of the vertical signal lines;
sampling capacitors, each connected to a second terminal of a corresponding one of the clamp capacitors;
clamp transistors, each having its drain connected to a reference voltage, and its source connected to a corresponding one of the sampling capacitors;
voltage comparison circuits, each connected in series with a corresponding one of the vertical signal lines;
clip circuits for outputting a clip voltage to a corresponding one of the sampling capacitors based on an output of a corresponding one of the voltage comparison circuits;
an image processing unit for processing an outputted image signal to output a signal to an external equipment including a display device; and
a timing control unit for transferring a signal to and from at least the pixels, the voltage comparison circuits, the image processing unit.

13. A method for driving a solid-state image sensor including
photodiodes arranged in a matrix to form pixels, for generating signal charge according to intensity of incident light, and accumulating the generated signal charge therein,
floating diffusions for holding the signal charge transferred from a corresponding one of the photodiodes,
transfer transistors, each provided between a corresponding one of the photodiodes and a corresponding one of the floating diffusions,
reset transistors, each having its drain connected to a power supply signal line, and its source connected to a corresponding one of the floating diffusions,
amplifying transistors for reading a voltage of a corresponding one of the floating diffusions,
vertical signal lines provided in each column of the pixels, for receiving a signal from corresponding ones of the pixels,
load transistors, each connected to a corresponding one of the vertical signal lines, and each forming a source follower circuit, together with a corresponding one of the amplifying transistors,
clamp capacitors, each having a first terminal connected to a corresponding one of the vertical signal lines, sampling capacitors, each connected to a second terminal of a corresponding one of the clamp capacitors, clamp transistors, each having its drain connected to a reference voltage, and its source connected to a corresponding one of the sampling capacitors, voltage comparison circuits, each connected in series with a corresponding one of the vertical signal lines, and clip circuits for outputting a clip voltage to a corresponding one of the sampling capacitors based on an output of a corresponding one of the voltage comparison circuits, the method comprising the steps of:

(a) turning on the transfer transistor to transfer a signal, accumulated in the photodiode, to the floating diffusion;

(b) after the step (a), resetting the floating diffusion to a reference voltage through the reset transistor; and (c) after the step (b), by using, as a comparison voltage, a voltage on the vertical signal line in a state where the step (a) is completed, the voltage comparison circuit determines if a voltage on the vertical signal line in a state where the floating diffusion is reset to the reference voltage in the step (b), is higher or lower than the comparison voltage.

14. The method of claim 13, wherein the reset transistor has a source connected to the floating diffusion, and a drain connected to the power supply signal line, and in the step (b), the reference voltage is applied from the power supply signal line through the reset transistor to the floating diffusion.

15. The method of claim 13, wherein each of the voltage comparison circuits is a comparator circuit which is formed by an inverting amplifier circuit.

16. The method of claim 13, wherein each of the voltage comparison circuits is a column amplifier circuit provided between the vertical signal line of a corresponding column and the clamp capacitor connected to the vertical signal line, for amplifying a voltage on the vertical signal line.

17. The method of claim 16, wherein the column amplifier circuit includes a first capacitive element having a first terminal connected to the vertical signal line, and a second terminal connected to the sampling capacitor, a signal amplifying circuit provided between the second terminal of the first capacitive element and the clamp capacitor, a second transistor provided between an input part and an output part of the signal amplifying circuit, and a switch transistor and a second capacitive element, which are provided between the input part and the output part of the signal amplifying circuit, and are connected in series with each other, wherein the switch transistor is turned on when the column amplifier circuit amplifies a signal, and the switch transistor is turned off in the step (c).

18. The method of claim 13, wherein in the step (c), when it is determined that the voltage on the vertical signal line in the state where the floating diffusion is reset to the reference voltage, is equal to, or higher than, the comparison voltage, the clip circuit outputs the clip voltage to the sampling capacitor, and when the voltage on the vertical signal line in the state where the floating diffusion is reset to the reference voltage, is lower than the comparative voltage, an amplified signal of the voltage on the vertical signal line is applied to the sampling capacitor.

* * * * *